United States Patent
Ivanovic et al.

(10) Patent No.: US 10,660,329 B2
(45) Date of Patent: May 26, 2020

(54) METHOD FOR PRESERVING CELLS, TISSUES OR ORGANS IN HYPOTHERMIA

(71) Applicants: ETABLISSEMENT FRANCAIS DU SANG, La Plaine Saint Denis (FR); UNIVERSITE DE BORDEAUX, Talence (FR); CENTRE NATIONAL DE LA RECHERCHE SCIENTIFIQUE, Paris (FR)

(72) Inventors: Zoran Ivanovic, Merignac (FR); Sandie Gerby, Artigues Près Bordeaux (FR); Marija Vlaski-Lafarge, Talence (FR)

(73) Assignees: ETABLISSEMENT FRANCAIS DU SANG, La Plaine Saint Denis (FR); UNIVERSITÉ DE BORDEAUX, Talence (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 84 days.

(21) Appl. No.: 15/568,004

(22) PCT Filed: Apr. 22, 2016

(86) PCT No.: PCT/FR2016/050948
§ 371 (c)(1),
(2) Date: Oct. 20, 2017

(87) PCT Pub. No.: WO2016/170281
PCT Pub. Date: Oct. 27, 2016

(65) Prior Publication Data
US 2018/0116206 A1 May 3, 2018

(30) Foreign Application Priority Data
Apr. 23, 2015 (FR) ..................... 15 53659

(51) Int. Cl.
*A01N 1/02* (2006.01)

(52) U.S. Cl.
CPC ......... *A01N 1/0284* (2013.01); *A01N 1/0226* (2013.01); *A01N 1/0242* (2013.01); *A01N 1/0252* (2013.01); *A01N 1/0263* (2013.01)

(58) Field of Classification Search
CPC .. A01N 1/0284; A01N 1/0263; A01N 1/0252; A01N 1/0242; A01N 1/0226
See application file for complete search history.

(56) References Cited

U.S. PATENT DOCUMENTS

| | | | |
|---|---|---|---|
| 4,904,259 | A | 2/1990 | Itay |
| 6,153,582 | A | 11/2000 | Skelnik |
| 8,815,860 | B2 | 8/2014 | Taylor et al. |
| 9,481,865 | B2 | 11/2016 | Zhang et al. |
| 2002/0009461 | A1 | 1/2002 | Isacson et al. |
| 2003/0054331 | A1 | 3/2003 | Fraser et al. |
| 2003/0139410 | A1 | 7/2003 | Sugaya et al. |
| 2005/0136125 | A1 | 6/2005 | Roth |
| 2008/0057040 | A1 | 3/2008 | Crook et al. |
| 2008/0089947 | A1 | 4/2008 | Knox et al. |
| 2008/0292677 | A1 | 11/2008 | Cortiella et al. |
| 2008/0311094 | A1 | 12/2008 | Sokal et al. |
| 2009/0004153 | A1 | 1/2009 | Chancellor et al. |
| 2009/0038419 | A1 | 2/2009 | Hiller et al. |
| 2009/0123437 | A1 | 5/2009 | Takebe |
| 2009/0258337 | A1 | 10/2009 | Yagi |
| 2010/0034783 | A1 | 2/2010 | Son et al. |
| 2012/0020934 | A1 | 1/2012 | Ma |
| 2012/0076854 | A1 | 3/2012 | Hope et al. |
| 2012/0244067 | A1 | 9/2012 | Roth et al. |
| 2013/0323708 | A1 | 12/2013 | Yarmush et al. |
| 2015/0306288 | A1 | 10/2015 | Delorme et al. |
| 2018/0184643 | A1 | 7/2018 | Ivanovic et al. |

FOREIGN PATENT DOCUMENTS

| | | |
|---|---|---|
| CN | 102754642 | 10/2012 |
| EP | 1 000 541 | 5/2000 |
| EP | 1 057 405 | 12/2000 |
| IN | 471/DEL/2006 | 3/2013 |
| RU | 2 079 273 | 5/1997 |
| WO | WO 91/01638 | 2/1991 |
| WO | WO 95/29230 | 11/1995 |
| WO | WO 97/41848 | 11/1997 |
| WO | WO 01/050851 | 7/2001 |
| WO | WO 01/52647 | 7/2001 |
| WO | WO 02/35929 | 5/2002 |
| WO | WO 03/068937 | 8/2003 |
| WO | WO 2005/072523 | 8/2005 |
| WO | WO 2006/057876 | 6/2006 |
| WO | WO 2007/015252 | 2/2007 |
| WO | WO 2007/058929 | 5/2007 |
| WO | WO 2008/024194 | 2/2008 |
| WO | WO 2008/131973 | 11/2008 |
| WO | WO 2008/143884 | 11/2008 |
| WO | WO 2009/120996 | 10/2009 |
| WO | WO 2010/050073 | 5/2010 |
| WO | WO 2013/020492 | 2/2013 |
| WO | WO 2017/042501 | 3/2017 |

OTHER PUBLICATIONS

Robinson et al. Low temperature cell pausing: an alternative short-term preservation method for use in cell therapies including stem cell applications. Biotechnol Lett (2014) 36:201-209 (Year: 2014).*
Celartia. Petaka Advantage. downloaded from http://celartia.com/cell-dormancy-advantag dated Sep. 8, 2013. p. 1-2 (Year: 2013).*
Written Opinion in International Application No. PCT/FR2016/050948, dated Jun. 27, 2016, pp. 1-5.

(Continued)

*Primary Examiner* — Taeyoon Kim
(74) *Attorney, Agent, or Firm* — Saliwanchik, Lloyd & Eisenschenk (57) ABSTRACT

The present invention relates to a method for preserving, preferably human, cells, tissues or organs in severe hypothermia, comprising a step during which the cells, tissues or organs are kept in moderate hypothermia and preferably in a hypoxic and/or hypercapnic atmosphere, before placing them in severe hypothermia.

13 Claims, 5 Drawing Sheets

(56) References Cited

OTHER PUBLICATIONS

Written Opinion in International Application No. PCT/FR2016/052253, dated Dec. 6, 2016, pp. 1-6.
Andjus, R. K. et al. "Reanimation of Adult Rats From Body Temperatures Between 0 and +2° C." *J. Physiol.*, pp. 446-472, vol. 128.
Boutilier, R. G. "Mechanisms of cell survival in hypoxia and hypothermia" *The Journal of Experimental Biology*, 2001, pp. 3171-3181, vol. 204.
Duchez, P. et al. "Cryopreservation of hematopoietic stem and progenitor cells amplified ex vivo from cord blood CD34+ cells" *Transfusion*, Sep. 2013, pp. 2012-2019, vol. 53.
Ivanovic, Z. et al. "CD34+ cells obtained from "good mobilizers" are more activated and exhibit lower ex vivo expansion efficiency than their counterparts from "poor mobilizers"" *Transfusion*, Jan. 2010, pp. 120-127, vol. 50.
Jeanne, M. et al. "Low-oxygen and high-carbon-dioxide atmosphere improves the conservation of hematopoietic progenitors in hypothermia" *Transfusion*, Aug. 2009, pp. 1738-1746, vol. 49.
Vlaski, M. et al. "Hypoxia/Hypercapnia-Induced Adaptation Maintains Functional Capacity of Cord Blood Stem and Progenitor Cells at 4° C." *J. Cell. Physiol.*, 2014, pp. 2153-2165, vol. 229.
Zieger, M. AJ. et al. "Proteomic analysis of endothelial cold-adaptation" *BMC Genomics*, 2011, pp. 1-22, vol. 12, No. 630.

\* cited by examiner

METHOD FOR PRESERVING CELLS, TISSUES OR ORGANS IN HYPOTHERMIA

CROSS-REFERENCE TO RELATED APPLICATION

This application is the U.S. national stage application of International Patent Application PCT/FR2016/050948, filed Apr. 22, 2016.

The present invention relates to a novel method for medium and long-term preservation of cells, tissues or organs. This method is more particularly intended for the preservation of transplants until their transplantation in the recipient.

BACKGROUND OF THE INVENTION

To date, cryopreservation is the only method available for medium- and long-term preservation of hematopoietic cell transplants. Indeed, without freezing and at a temperature of 4° C., it was observed that the number and the functional capacity of progenitor cells contained in transplants decreased drastically after only 3 days of preservation (Hechler et al., 1996).

Cryopreservation, however, has notable disadvantages, particularly potential agglutination during thawing or the risk of anaphylactic reaction triggered by the presence of cryoprotectants. Moreover, this method is not applicable to all cell types.

Previous studies have shown that short-term preservation at 4° C. of CD34+ hematopoietic stem cells was improved by modifying the atmospheric conditions of cultures, notably by decreasing the oxygen concentration and increasing the carbon dioxide concentration (Vlaski et al., 2014). Although notable, these improvements remain inadequate to ensure the survival and the maintenance of the functional capacities of cells, and in particular of progenitor cells, for long-term preservation at 4° C.

An optimal method would allow long-term preservation of transplants under hypothermic conditions, without freezing, and would thus simplify transplantation logistics and procedures while improving the results obtained in the recipient.

SUMMARY OF THE INVENTION

The inventors have shown that preincubating cells in moderate hypothermia and under a hypoxic and/or hypercapnic atmosphere before preserving same in severe hypothermia made it possible to substantially improve the survival and the proliferative capacity of said cells, notably in the case of stem cells.

Thus, according to a first aspect, the present invention relates to an in vitro or ex vivo method for preserving animal cells, preferably human cells, in severe hypothermia, comprising a step consisting in maintaining said cells in moderate hypothermia and under a hypoxic and/or hypercapnic atmosphere for about 12 to about 72 hours, before preserving same in severe hypothermia.

The cells may be preserved in severe hypothermia at a temperature of between about 1° C. and about 12° C., preferably of about 4° C.

The cells may be maintained in moderate hypothermia at a temperature of between about 20° C. and about 35° C., preferably of about 30° C.

The cells may be maintained in moderate hypothermia and under a hypoxic and/or hypercapnic atmosphere for about 24 to about 48 hours, preferably for about 48 hours.

The hypoxic atmosphere may comprise about 0.5% to about 10% dioxygen, preferably about 5% dioxygen.

The hypercapnic atmosphere may comprise about 5% to about 20% carbon dioxide, preferably about 9% carbon dioxide.

Preferably, the cells are maintained in moderate hypothermia and under a hypoxic and hypercapnic atmosphere.

The cells preserved according to the method of the invention may be skin cells, cartilage cells, osteocytes, endothelial cells, muscle cells, neural cells, retinal cells, pancreatic cells, blood cells, or stem or progenitor cells capable of differentiating into these cells.

These cells may notably be organized into tissue, preferably selected from the group consisting of skin, cornea, tendon, bone tissue, blood vessel, nerve, heart valve, amniotic membrane, cartilage tissue, islet of Langerhans and muscle tissue, or organized into a complete or partial organ, preferably selected from the group consisting of kidney, liver, heart, umbilical cord, placenta, intestine, lung and pancreas.

Preferably, the preserved cells are hematopoietic stem cells, mesenchymal stem cells or a combination thereof, preferably hematopoietic stem cells.

According to another aspect, the present invention also relates to a kit comprising a cell preservation medium, a first sterile container for receiving cells, tissues or organs and the cell preservation medium, and a device for creating a hypoxic and/or hypercapnic atmosphere in the first container comprising the cells, tissues or organs, and optionally a second container for maintaining the first container and/or the cells, tissues or organs at a controlled temperature.

Alternatively, the kit may comprise a sterile container for receiving cells, tissues or organs and the cell preservation medium, containing a hypoxic and/or hypercapnic atmosphere, said sterile container being optionally prefilled with cell preservation medium.

According to yet another aspect, the present invention also relates to the use of a kit according to the invention for implementing the method according to the invention, i.e., for preserving animal cells in severe hypothermia.

BRIEF DESCRIPTION OF THE DRAWINGS

FIG. 5: FDCPmix cells. Yield of viable cells relative to t=0. Air: 21% $O_2$ and 0.01% $CO_2$; HH: 9% $CO_2$ and 5% $O_2$;

Hypo: 5% $O_2$ and 0.001 $CO_2$; Hyper: 20% $O_2$ and 20% $CO_2$.
*: $p<0.5$; : $p<0.01$; *: $p<0.001$.

DETAILED DESCRIPTION OF THE INVENTION

In previous studies, the inventors of the present invention observed that hypoxia and hypercapnia improved the preservation of hematopoietic stem cells relative to their exposure to air (Jeanne et al., 2009; Ivanovic et al., 2010; Vlaski et al., 2014).

In the experimental section of the present application, the inventors have shown that preincubating stem cells for 2 days in moderate hypothermia (30° C.) before transferring them to 4° C., very significantly improved the survival of these cells and the functional capacity of progenitors relative to direct placement at 4° C. The results obtained are all the more marked when preincubation is combined with a hypoxic and/or hypercapnic atmosphere. These results, validated on three different cell types, namely $CD34^+$ hematopoietic cells, mesenchymal cells and cells of the FDCPmix cell line, indicate that this method may be used to improve the preservation of cells, tissues or organs in hypothermia, notably for transplantation.

Thus, according to a first aspect, the present application relates to an in vitro or ex vivo method for preserving animal cells in severe hypothermia, comprising a step consisting in maintaining said cells in moderate hypothermia for a short period, before preserving same in severe hypothermia.

The aim of the method according to the invention is to improve the preservation of animal cells when they are preserved in severe hypothermia, without freezing. As used herein, the term "severe hypothermia" refers to temperatures above 0° C. and below 15° C. Preferably, this term refers to temperatures of between about 1° C. and about 12° C., namely of about 1, 2, 3, 4, 5, 6, 7, 8, 9, 10, 11 or 12° C., preferably of between about 1° C. and about 8° C., and in particular of between about 2° C. and about 8° C. More particularly preferably, severe hypothermia corresponds to a temperature of between about 1° C. and about 6° C., preferably of about 4° C.

As used herein, the term "about" refers to a range of values of ±5% of the specified value, preferably ±2% of the specified value. For example, "about 20" includes 20±5%, or 19 to 21. It is understood that values preceded by the term "about" must also be regarded as specifically described in the present application. For example, the expression "a temperature of between about 1° C. and about 12° C." must also be regarded as describing "a temperature of between 1° C. and 12° C.". Likewise, the expression "a temperature of about 4° C." must also be regarded as describing "a temperature of 4° C.".

Before being placed in severe hypothermia, the cells are maintained in moderate hypothermia for a short period. As used herein, the term "moderate hypothermia" refers to temperatures of between about 20° C. and about 35° C., namely of about 20, 21, 22, 23, 24, 25, 26, 27, 28, 29, 30, 31, 32, 33, 34 or 35° C., preferably of between about 25° C. and about 32° C., more preferably of between about 27° C. and about 32° C. More particularly preferably, moderate hypothermia corresponds to a temperature of about 30° C.

In the method according to the invention, the cells are placed in moderate hypothermia for about 12 hours to about 72 hours, preferably for about 24 hours to about 60 hours or for about 36 hours to about 60 hours, before being placed in severe hypothermia for longer-term preservation. Preferably, the phase of moderate hypothermia lasts from about 24 hours to about 48 hours, and particularly preferably for about 48 hours.

According to a preferred embodiment, the cells are placed in severe hypothermia immediately after the step in moderate hypothermia.

In the method according to the invention, the cells may be preserved in severe hypothermia for a long period, for example from several days to several months, before being used. In particular, the cells may be preserved in severe hypothermia for more than 24 hours, in particular for 1 day to 120 days, preferably for 1 day to 1 month, more preferably for 1 day to 15 days, and more particularly preferably for 5 days to 10 days.

The cells preserved by the method according to the invention are preferably cells which have been harvested from an animal or a donor, preferably a mammal, and particularly preferably a human. In particular, these cells may be intended for subsequent administration to a recipient in the context of transplantation.

According to a preferred embodiment, the cells are neither frozen nor subjected to conditions of severe hypothermia before being placed in moderate hypothermia. The cells are preferably placed in moderate hypothermia within at most 4 hours after being harvested from the donor. Particularly preferably, the cells are placed in moderate hypothermia immediately after being harvested, i.e. within an hour after being harvested.

Before preservation, the cells may be subjected to various analyses such as serology, HLA typing, and phenotypical, morphological (notably in the case of cells organized into tissues or organs) or bacteriological examinations.

As shown in the experimental section, the preliminary step in moderate hypothermia is sufficient to improve preservation of the cells. However, according to certain preferred embodiments, this step is combined with adjustment of the atmospheric conditions of the culture to create a hypoxic, hypercapnic or hypoxic/hypercapnic atmosphere, preferably a hypoxic/hypercapnic atmosphere.

A hypoxic atmosphere is an atmosphere comprising a reduced dioxygen concentration relative to the concentration in air, which is usually 20 to 21%. As used herein, the term "hypoxic atmosphere" refers to an atmosphere comprising less than 10% $O_2$. Thus, a hypoxic atmosphere may comprise for example between about 0.5% and about 10% $O_2$, i.e., about 0.5, 1, 2, 3, 4, 5, 6, 7, 8, 9 or 10%. According to certain preferred embodiments, a hypoxic atmosphere comprises between about 1% and about 5% $O_2$. Particularly preferably, the hypoxic atmosphere comprises about 5% $O_2$. In a hypoxic atmosphere, the carbon dioxide concentration preferably corresponds to that of ambient air, namely about 0.05%. The rest of the gas mixture is generally composed of nitrogen dioxide.

A hypercapnic atmosphere is an atmosphere comprising an increased carbon dioxide concentration relative to the concentration in air, which is usually below 0.05%. As used herein, the term "hypercapnic atmosphere" preferably refers to an atmosphere comprising more than 5% $CO_2$. Thus, a hypercapnic atmosphere may comprise for example between about 5% and about 20% $CO_2$, i.e., about 5, 6, 7, 8, 9, 10, 11, 12, 13, 14, 15, 16, 17, 18, 19 or 20%. According to certain preferred embodiments, a hypercapnic atmosphere comprises between about 5% and about 10% $CO_2$, preferably between about 6% or 7% and about 10% $CO_2$. According to other preferred embodiments, a hypercapnic atmosphere comprises between about 6% and about 20% $CO_2$, preferably between about 9% and about 20% $CO_2$. Particularly preferably, the hypercapnic atmosphere comprises about 9% $CO_2$. In a hypercapnic atmosphere, the dioxygen concentration preferably corresponds to that of ambient air, namely about 20-21%. The rest of the gas mixture is generally composed of nitrogen dioxide.

A hypoxic/hypercapnic atmosphere is an atmosphere comprising a reduced dioxygen concentration and an increased carbon dioxide concentration relative to the usual concentrations in ambient air. More specifically, as used herein, the term "hypoxic/hypercapnic atmosphere" refers to an atmosphere comprising less than 10% $O_2$ and more than 5% $CO_2$. The preferred $O_2$ and $CO_2$ value ranges are as defined above for hypoxic and hypercapnic conditions. Particularly preferably, the hypoxic/hypercapnic atmosphere comprises about 5% $O_2$ and about 9% $CO_2$. The rest of the gas mixture is generally composed of nitrogen dioxide.

Each of these particular gas mixtures may be obtained by methods well-known to a person skilled in the art, notably by means of controlled-atmosphere incubation chambers available from a variety of suppliers.

The cells preserved by the method according to the invention may be any animal cell for which preservation in severe hypothermia is desired.

Preferably, the cells are mammalian cells, and particularly preferably human cells.

According to a preferred embodiment, the cells are cells intended to be transplanted into a recipient and are preferably harvested from a donor. The donor and the recipient may be the same individual (autologous transplant) or different individuals (allogenic transplant).

The cells may be isolated cells or cells organized into tissues or organs.

According to an embodiment, the preserved cells are isolated cells. These cells may be selected for example from the group consisting of skin cells, cartilage cells, osteocytes, endothelial cells, muscle cells, neural cells, retinal cells, pancreatic cells, blood cells, or stem cells or progenitor cells capable of differentiating into these cells.

The stem cells may be pluripotent stem cells (capable of differentiating into all cell types of an organism), multipotent stem cells (capable of differentiating into cell types of various tissues) or unipotent stem cells (capable of differentiating into cell types of a single tissue). Progenitor cells are cells capable of differentiating into various cell types of a single tissue. They may be oligopotent (capable of differentiating into a small number of cell types, for example CFU-GEMM progenitor cells), bipotent (capable of differentiating into two cell types, for example CFU-GM progenitor cells) or unipotent (capable of differentiating into a single cell type, for example CFU-G, CFU-M, CFU-MK, BFU-E and CFU-E progenitor cells). Unlike progenitor cells, stem cells have a genuine capacity for self-renewal and a much greater proliferative capacity.

In an embodiment, the stem cells are pluripotent stem cells selected from embryonic stem cells, multipotent adult progenitor cells (MAPCs) or induced pluripotent stem cells.

Embryonic stem cells are derived from the inner cell mass of the blastocyst and are able to lead to the formation of all tissues of the organism (mesoderm, endoderm, ectoderm), including germ cells. The pluripotency of embryonic stem cells can be evaluated by the presence of markers such as transcription factors OCT4 and NANOG and surface markers such as SSEA3/4, Tra-1-60 and Tra-1-81. Embryonic stem cells may be obtained without destruction of the embryo from which they are removed, for example using the technique described by Chung et al. (2008). In a particular embodiment, and for legal or ethical reasons, the embryonic stem cells are non-human embryonic stem cells. Generally, according to a particular embodiment, the cells preserved according to the method of the invention are not human embryonic stem cells.

Multipotent adult progenitor cells can, like embryonic stem cells, differentiate into cells from any of the three embryonic layers and express transcription factors OCT4 and NANOG. These cells can be isolated from various organs, notably from bone marrow (Schwartz et al., 2002).

Induced pluripotent stem cells (iPSCs) are pluripotent cells obtained by genetic reprogramming of differentiated somatic cells. Besides a morphology and a potential for self-renewal and pluripotency similar to those of embryonic stem cells, iPSCs also exhibit epigenetic reprogramming with an overall histone methylation and gene expression profile very close to that of embryonic stem cells. These cells are notably positive for pluripotency markers, particularly alkaline phosphatase staining and expression of NANOG, SOX2, OCT4 and SSEA3/4 proteins. Methods for obtaining induced pluripotent stem cells are well-known to a person skilled in the art and are notably described in the articles by Yu, et al. (2007); Takahashi, et al. (2007); and Nakagawa, et al. (2008).

In another embodiment, the stem cells are multipotent stem cells. Non-limiting examples of multipotent stem cells include hematopoietic stem cells capable of differentiating into blood cells and immune cells, namely white blood cells, red blood cells and platelets, in particular hematopoietic stem cells expressing the CD34 antigen, or mesenchymal stem cells capable of differentiating into cartilage cells (chondrocytes), bone cells (osteoblasts) and fat cells (adipocytes). $CD34^+$ hematopoietic stem cells and mesenchymal stem cells can be isolated from bone marrow using any technique known to a person skilled in the art, for example using an immunomagnetic system or a filtration system.

In another embodiment, the stem cells are unipotent stem cells. Non-limiting examples of unipotent stem cells include stem cells of the skin, liver and intestinal mucosa.

According to a preferred embodiment, the preserved cells are or contain stem cells, preferably hematopoietic or mesenchymal stem cells, or a combination thereof. Particularly preferably, the preserved cells are hematopoietic stem cells.

In certain embodiments, the preserved cells may be organized into tissues or organs.

Non-limiting examples of tissues that can be preserved according to the method of the invention include skin, cornea, tendon, bone tissue, blood vessel, nerve, heart valve, amniotic membrane, cartilage tissue, islet of Langerhans and muscle tissue.

The organs preserved according to the method of the invention may be complete, for example a complete kidney or liver, or partial, for example a partial liver. Non-limiting examples of organs that can be preserved according to the method of the invention include kidney, liver, heart, umbilical cord, placenta, intestine, lung and pancreas.

In the method according to the invention, the cells, tissues or organs may be preserved in any suitable medium, preferably liquid medium. There exists a multitude of media suited to the preservation of cells, tissues or organs. A person skilled in the art can easily choose a suitable medium according to the type of cells, tissues or organs to be preserved. Such media are described for example in international patent applications WO 2014/057220, WO 2014/120014, WO 2012/129538, WO 2011/159359, WO 06/052133, WO 97/33978 and WO 00/02572. Many suppliers also market suitable media, such as for example HP01 and HP02 from Macopharma, Stem Alpha A and Stem Alpha S3 from Stemcell, or Viaspan (University of Wisconsin solution).

The medium preferably allows cells to survive without stimulating their proliferation.

One advantage of the method according to the invention is that it does not require the use of cryoprotectants in the preservation medium. The latter may be injected directly, notably in the case of transplantation of hematopoietic stem cells, or require washing of the transplant before administration.

In the case of organs or tissues, they may be immersed in a suitable volume in order to be completely covered.

Before the cells are used, notably in the context of transplantation, various tests can be performed to check the quality of the transplant, for example measurement of apoptosis or a clonogenic test of granulocyte/macrophage colony forming unit(CFU-GM) or granulocyte/macrophage colony forming cell (CFC-GM) progenitors performed in the context of quality control of hematopoietic transplants.

In another aspect, the present application also relates to a kit.

According to a first embodiment, said kit comprises:
a cell preservation medium,
a first sterile container for receiving cells, tissues or organs and the cell preservation medium, and
a device for creating a hypoxic and/or hypercapnic atmosphere in the first container comprising the cells, tissues or organs.

Optionally, the first sterile container may be prefilled with cell preservation medium.

A hypoxic and/or hypercapnic atmosphere may be created in the first container after having placed the cells, tissues or organs therein.

According to a particular embodiment, said container comprises an inlet and an outlet allowing gas exchange, and the device for creating a hypoxic and/or hypercapnic atmosphere is used to inject the desired atmosphere into said container. Said inlet and outlet are then closed to maintain the cells, tissues or organs in said atmosphere. The device for creating a hypoxic and/or hypercapnic atmosphere is preferably a pressurized device such as a gas cartridge.

According to another particular embodiment, the sterile container comprising the cells, tissues or organs may be placed in a controlled-atmosphere incubation chamber allowing creation of a hypoxic and/or hypercapnic atmosphere.

According to a second embodiment, the kit may comprise a sterile container for receiving cells, tissues or organs and the cell preservation medium, containing a hypoxic and/or hypercapnic atmosphere. Optionally, said sterile container may be prefilled with cell preservation medium.

The kit according to the invention may further comprise a second container for maintaining the first container and/or the cells, tissues or organs at a controlled temperature.

This second container maintains the cells, tissues or organs in moderate hypothermia, preferably immediately after being harvested. This same container may then be used to place the cells, tissues or organs in severe hypothermia. Alternatively, the cells, tissues or organs may be moved to a new container when they are placed in severe hypothermia.

The cell preservation medium may be any preservation medium as described below and suited to the cells, tissues or organs to be preserved.

The kit according to the invention is particularly suited to the transport and preservation of cells, tissues or organs from the donor to the recipient in the context of transplantation.

Optionally, the kit may also comprise other containers such as a container for receiving a blood sample from the donor for determining blood type, or a container for receiving a sample of spleen or ganglia for HLA typing.

The present invention also relates to the use of a kit as described above for implementing the method according to the invention.

All references cited in this description are incorporated by reference in the present application. Other features and advantages of the invention will become more apparent upon reading the following illustrative non-limiting examples.

EXAMPLES

Example 1

Placental blood CD34$^+$ cells

Materials and Methods

After being isolated by an immunomagnetic system, CD34$^+$ cells were incubated overnight in culture at 37° C. in HP01 medium (Macopharma) in the presence of stem cell factor (SCF; 100 ng/mL), thrombopoietin (20 ng/mL) and IL-3 (1 ng/mL) at a concentration of about $10^5$ cells per mL. This medium ensures the survival of CD34$^+$ cells without stimulating their proliferation. This culture was divided into 8 gas-impermeable flasks (2 per atmospheric condition: i) air (21% $O_2$, 0.01% $CO_2$); ii) hypoxia/hypercapnia (HH) (9% $CO_2$, 5% $O_2$); iii) hypoxia (5% $O_2$, 0.001% $CO_2$); iv) hypercapnia (20% $O_2$ and 20% $CO_2$)). All the flasks are placed overnight (about 16 hours) at 37° C. then 1 hour in modified atmosphere according to the preceding conditions at 37° C. One flask per condition is placed directly at +4° C. for 13 days and the other at 30° C. for 2 days, then at +4° C. for 11 days (13 days in total). At the end of this period, the cells were heated at 37° C. for 2 hours and evaluated in terms of viability/apoptosis by analysis of annexin V expression and propidium iodide fixation, and by the functional test of colony-forming capacity in semisolid culture (Duchez et al., 2013).

Results

Figure 1:
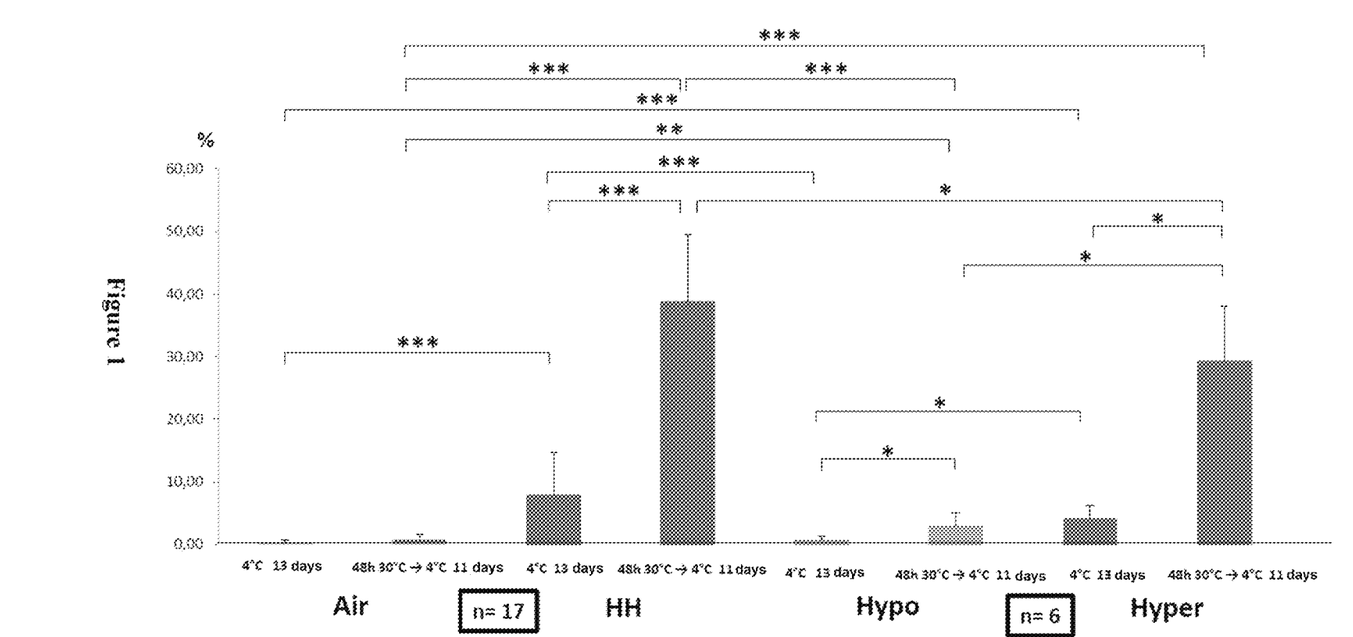
FIG. 1: Placental blood CD34+ cells. Yield of viable cells relative to t=0. Air: 21% $O_2$ and 0.01% $CO_2$; HH: 9% $CO_2$ and 5% $O_2$; Hypo: 5% $O_2$ and 0.001 $CO_2$; Hyper: 20% $O_2$ and 20% $CO_2$. *: $p<0.5$; : $p<0.01$; *: $p<0.001$.

FIG. 1 shows the yield of viable cells not undergoing apoptosis. The results presented in this figure show that when cells are placed directly in severe hypothermia at +4° C. and preserved for 13 days in air, all the viable cells are lost.

If, on the other hand, the suspensions were transferred directly at +4° C. to a hypoxic/hypercapnic atmosphere after 13 days, about 10% of the cells survived. This positive effect of hypoxia/hypercapnia is multiplied by 4 if the cells are preincubated for 2 days in moderate hypothermia (30° C.).

Hypoxia alone combined with preincubation at 30° C. moderately improves cell survival whereas it has no positive effect without this preincubation.

Hypercapnia alone is beneficial with or without preincubation, but the effect with preincubation in moderate hypothermia is 6 times greater.

Figure 2:
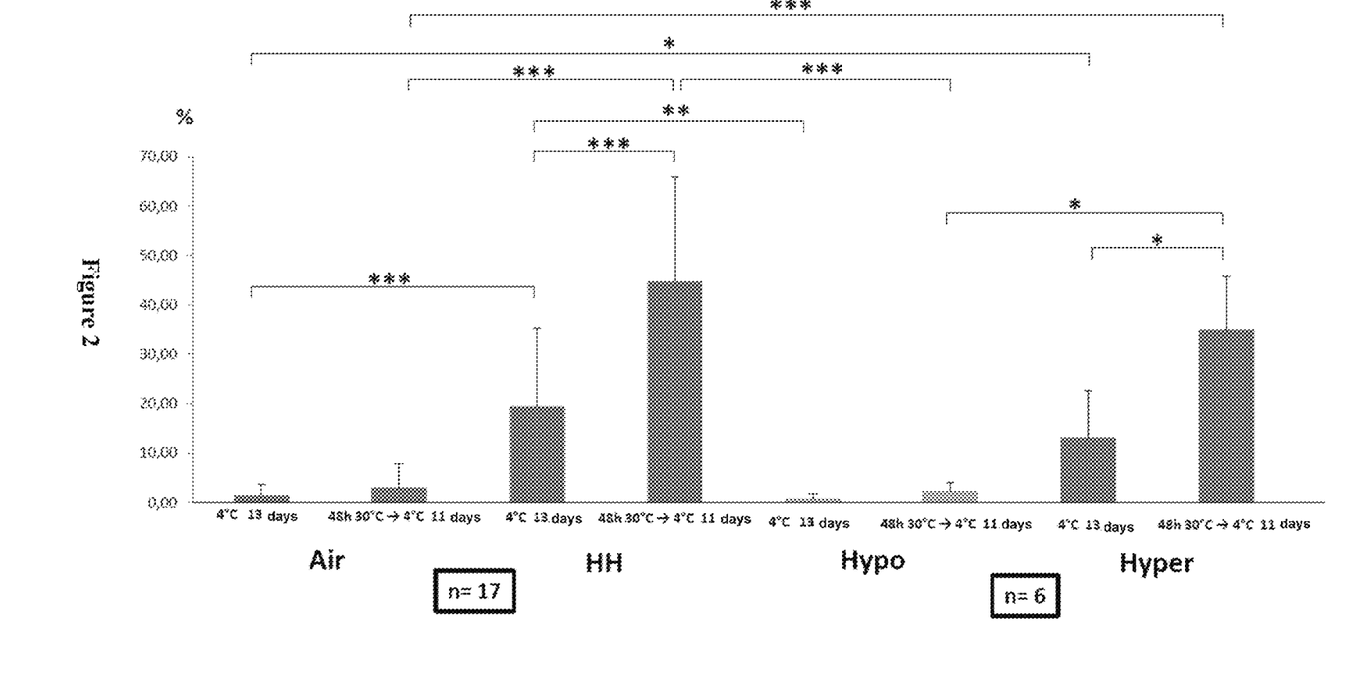
FIG. 2: Placental blood CD34− cells. Yield of clonogenic progenitor cells relative to t=0. Air: 21% $O_2$ and 0.01% $CO_2$; HH: 9% $CO_2$ and 5% $O_2$; Hypo: 5% $O_2$ and 0.001 $CO_2$; Hyper: 20% $O_2$ and 20% $CO_2$. *: $p<0.5$; : $p<0.01$; *: $p<0.001$.

Quite similar results were obtained for clonogenic progenitors under the conditions studied (FIG. 2). These data thus clearly show that the combination of hypercapnia and hypoxia with preincubation in moderate hypothermia spectacularly improves the survival of CD34$^+$ cells as well as clonogenic progenitors of placental blood. The period observed (13 days) is extremely long and the level of survival of the cells and the progenitors (40 to 65%) exceeds all expectations.

Example 2

Mesenchymal Cells

Materials and Methods

In this example, and for the sake of clarity, only mesenchymal cells (MCs) capable of forming adherent fibroblast-like cell colonies (CFU-F) were considered.

Previously frozen mesenchymal cells produced from human bone marrow (cells retained on filters used for bone marrow filtration before transplantation) were thawed, cultured (α MEM, 10% FCS, β FGF (1 ng/mL), L-glutamine (2 mM), 0.5% penicillin-streptomycin) at 37° C. and 5% $CO_2$ in 9 flasks and amplified to confluence. The flasks are then vented at 37° C. as follows: i) air (21% $O_2$, 0.01% $CO_2$); ii) hypoxia/hypercapnia (HH) (9% $CO_2$, 5% $O_2$); iii) hypoxia (5% $O_2$, 0.001 $CO_2$); iv) hypercapnia (20% $O_2$ and 20% $CO_2$) (2 flasks per condition; the $9^{th}$ flask being used for analysis of viability/apoptosis and for the clonogenic test before preservation in hypothermia). For each condition, the first flask was placed directly at +4° C. and preserved at 4° C. for 5 days and the second was maintained at 30° C. for 48 hours then at 4° C. for 3 days. After 5 days, the cells were heated for 2 hours at 37° C. and analyzed (viability/apoptosis and clonogenic capacity by CFU-F cultures, see Example 1).

Results

Figure 3:
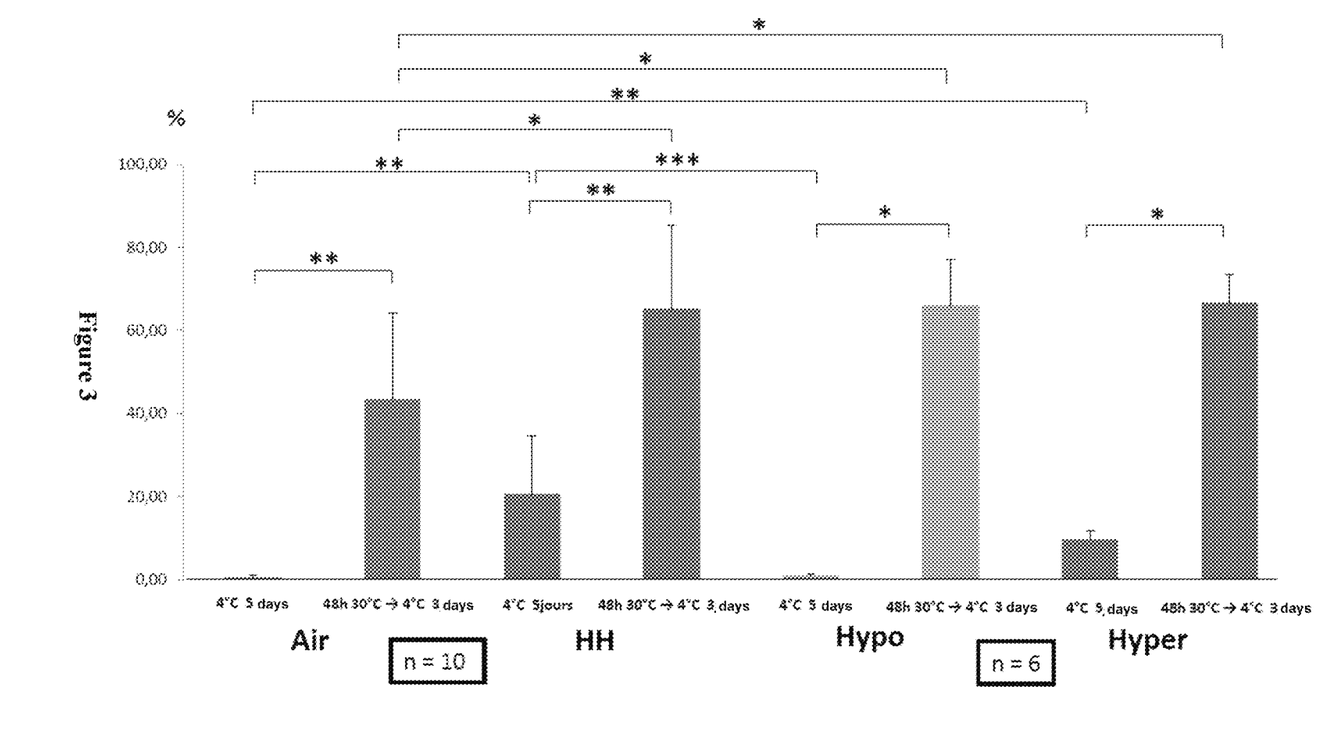
FIG. 3: Human mesenchymal cells. Yield of viable cells relative to t=0. Air: 21% $O_2$ and 0.01% $CO_2$; HH: 9% $CO_2$ and 5% $O_2$; Hypo: 5% $O_2$ and 0.001 $CO_2$; Hyper: 20% $O_2$ and 20% $CO_2$. *: $p<0.5$; : $p<0.01$; *: $p<0.001$.

As shown in FIG. 3, a period of 48 hours in moderate hypothermia drastically improves the survival of mesenchymal cells, even in air where all of the cells died if they are incubated at +4° C. for 5 days.

Hypoxia/hypercapnia improves the survival of MCs placed directly at +4° C. and this effect is multiplied by 3 by a period at 30° C.

Figure 4:
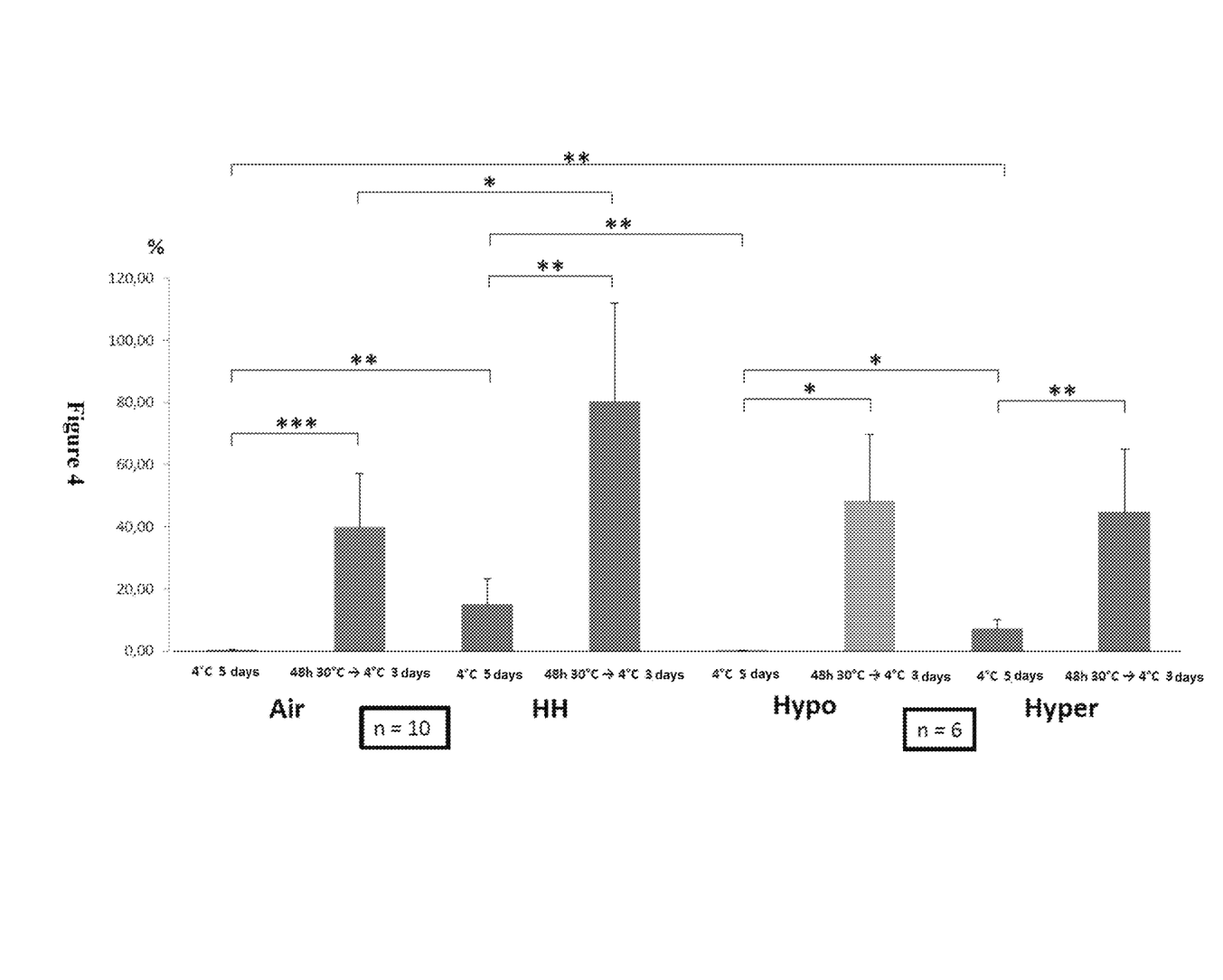
FIG. 4: Human mesenchymal cells. Yield of clonogenic progenitor cells relative to t=0. Air: 21% $O_2$ and 0.01% $CO_2$; HH: 9% $CO_2$ and 5% $O_2$; Hypo: 5% $O_2$ and 0.001 $CO_2$; Hyper: 20% $O_2$ and 20% $CO_2$. *: $p<0.5$; : $p<0.01$; *: $p<0.001$.

With a period in moderate hypothermia, hypoxia and hypercapnia each separately ensure maximal maintenance of MCs (at around 70%). Quite similar results are obtained for MSCs (CFU-F) (FIG. 4).

Example 3

Cells of the FDCPmix Cell Line

Materials and Methods

FDCPmix cells are amplified at 37° C. and 5% $CO_2$ in RPMI medium supplemented with 20% horse serum and 8% WEHI-conditioned medium (source of interleukin-3). The cells are then divided into 2 flasks per condition under the following conditions: i) air (21% $O_2$, 0.01% $CO_2$); ii) hypoxia/hypercapnia (HH) (9% $CO_2$, 5% $O_2$); iii) hypoxia (5% $O_2$, 0.001 $CO_2$); iv) hypercapnia (20% $O_2$ and 20% $CO_2$). The protocol followed is the same as for mesenchymal cells in Example 2.

Results

Maintenance of FDCPmix cells is poor in air and in hypoxic/hypercapnic conditions without a period in moderate hypothermia (directly at +4° C.).

Figure 5:
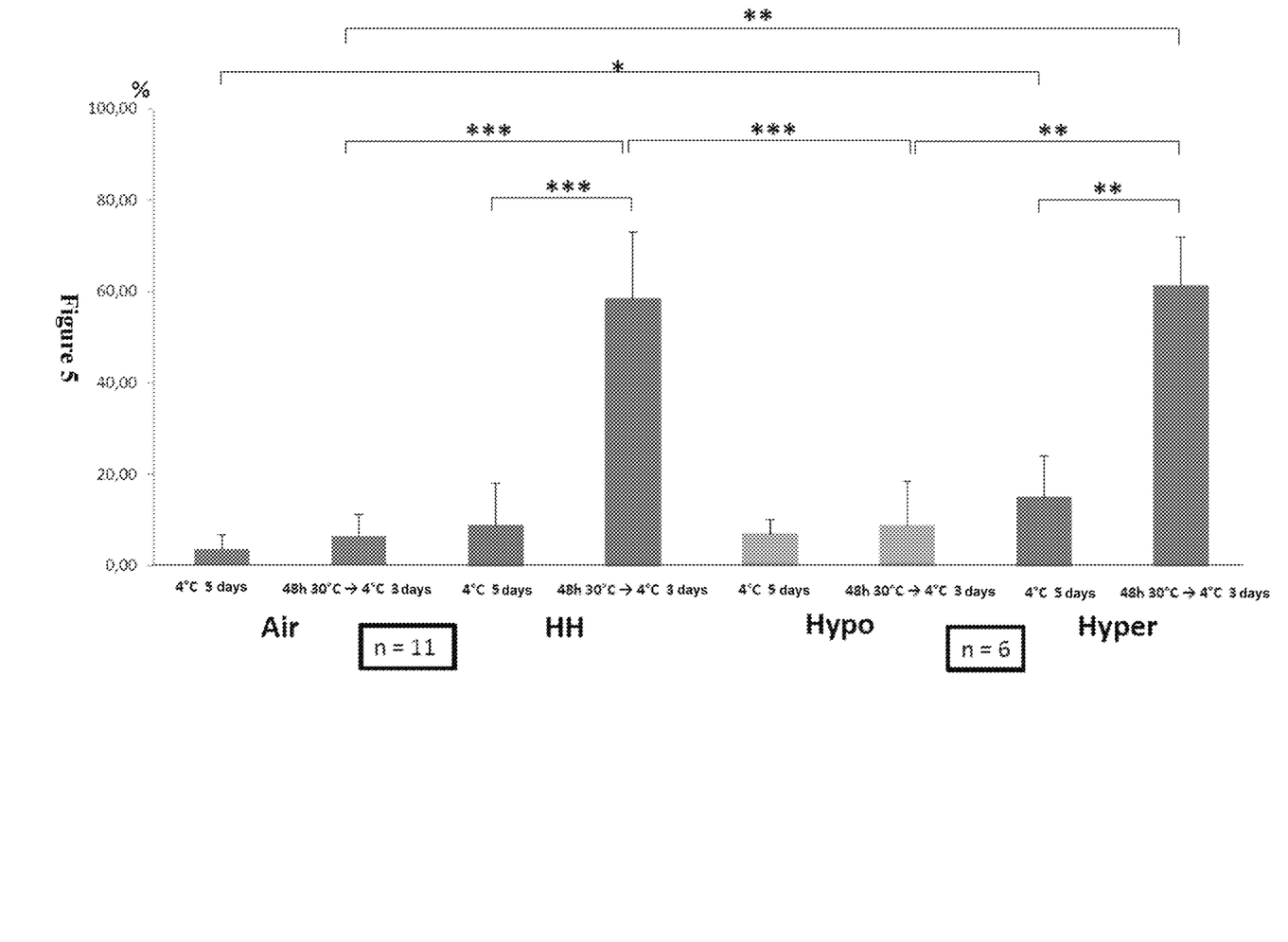

On the other hand, the combination hypoxia/hypercapnia or hypercapnia alone with a period in moderate hypothermia provides very good maintenance with about 60% of the FDCPmix cells (FIG. 5).

REFERENCES

Chung et al. Cell Stem Cell. 2008 Feb. 7; 2(2):113-7
Duchez et al. Transfusion. 2013 September; 53(9):2012-9.
Hechler et al. Ann Hematol, 1996; 72:303-6
Ivanovic et al. Transfusion. 2010 January; 50(1):120-7.
Jeanne et al. Transfusion. 2009 August; 49(8):1738-46
Nakagawa et al. Nat Biotechnol. 2008 January; 26(1):101-6.
Schwartz et al. J Clin Invest. 2002 May; 109(10):1291-302.
Takahashi, et al. 2007. Cell 131(5):861-872
Vlaski et al. J Cell Physiol. 2014, 229:2153-2165
Yu et al., 2007. Science 318(5858):1917-1920

The invention claimed is:

1. An in vitro or ex vivo method for preserving mammalian cells comprising a step of maintaining said cells in moderate hypothermia and under a hypoxic and/or hypercapnic atmosphere for about 12 to about 72 hours, and subsequently preserving said mammalian cells in severe hypothermia for 1 to 120 days.

2. The method according to claim 1, wherein the cells are preserved in severe hypothermia at a temperature between about 1° C. and about 12° C.

3. The method according to claim 1, wherein the cells are maintained in moderate hypothermia at a temperature between about 20° C. and about 35° C.

4. The method according to claim 1, wherein the cells are maintained in moderate hypothermia at a temperature between about 27° C. and about 32° C.

5. The method according to claim 4, wherein the cells are maintained in moderate hypothermia at a temperature of about 30° C.

6. The method according to claim 1, wherein the cells are maintained in moderate hypothermia and under a hypoxic and/or hypercapnic atmosphere for about 24 to about 48 hours.

7. The method according to claim 1, wherein the cells are preserved in severe hypothermia for 1 to 15 days.

8. The method according to claim 1, wherein the hypoxic atmosphere comprises about 0.5% to less than 10% dioxygen.

9. The method according to claim 1, wherein the hypercapnic atmosphere comprises more than 5% to about 20% carbon dioxide.

10. The method according to claim 1, wherein the cells are maintained in moderate hypothermia and under a hypoxic and hypercapnic atmosphere.

11. The method according to claim 1, wherein the cells are skin cells, cartilage cells, osteocytes, endothelial cells, muscle cells, neural cells, retinal cells, pancreatic cells, blood cells, or stem or progenitor cells capable of differentiating into these cells.

12. The method according to claim 1, wherein the cells are organized into tissue or are organized into a complete or partial organ.

13. The method according to claim 1, wherein the cells are hematopoietic stem cells, mesenchymal stem cells or a combination thereof.

* * * * *

UNITED STATES PATENT AND TRADEMARK OFFICE
CERTIFICATE OF CORRECTION

PATENT NO.        : 10,660,329 B2
APPLICATION NO.   : 15/568004
DATED             : May 26, 2020
INVENTOR(S)       : Zoran Ivanovic, Sandie Gerby and Marija Vlaski-Lafarge Page 1 of 1

It is certified that error appears in the above-identified patent and that said Letters Patent is hereby corrected as shown below:

In the Specification

Column 2,
Line 52, "$CD34^-$" should read --$CD34^+$--.

Signed and Sealed this
Twenty-fifth Day of August, 2020

Andrei Iancu
*Director of the United States Patent and Trademark Office*